US006389163B1

(12) United States Patent
Jodoin et al.

(10) Patent No.: US 6,389,163 B1
(45) Date of Patent: May 14, 2002

(54) METHOD AND APPARATUS FOR AUTOMATIC IMAGE SEGMENTATION USING TEMPLATE MATCHING FILTERS

(75) Inventors: Ronald E. Jodoin, Pittsford; Robert P. Loce; Reiner Eschbach, both of Webster, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 08/342,283

(22) Filed: Nov. 18, 1994

(51) Int. Cl.⁷ .................................................. G06K 9/34

(52) U.S. Cl. ..................... 382/173; 382/217; 358/462

(58) Field of Search ............................. 382/173, 176, 382/209, 217, 260; 358/462, 464

(56) References Cited

U.S. PATENT DOCUMENTS

| | | | |
|---|---|---|---|
| 4,119,946 A | * 10/1978 | Taylor | 382/222 |
| 4,194,221 A | 3/1980 | Stoffel | 358/283 |
| 4,703,362 A | 10/1987 | Deutermann et al. | 358/263 |
| 4,741,046 A | * 4/1988 | Matsunawa et al. | 382/176 |
| 4,811,115 A | 3/1989 | Lin et al. | 358/283 |
| 4,852,183 A | * 7/1989 | Abe et al. | 382/218 |
| 5,034,990 A | * 7/1991 | Klees | 358/462 |
| 5,065,437 A | 11/1991 | Bloomberg et al. | 382/9 |
| 5,131,049 A | 7/1992 | Bloomberg et al. | 382/9 |
| 5,245,445 A | 9/1993 | Fujisawa | 358/458 |
| 5,339,365 A | * 8/1994 | Kawai et al. | 382/176 |
| 5,341,226 A | 8/1994 | Shiau | 358/518 |
| 5,379,130 A | * 1/1995 | Wang et al. | 382/176 |
| 5,386,508 A | * 1/1995 | Itonori et al. | 382/176 |

FOREIGN PATENT DOCUMENTS

| | | | |
|---|---|---|---|
| EP | 0521662 | 7/1993 | H04N/1/40 |
| GB | 2153619 | 8/1985 | H04N/1/40 |

OTHER PUBLICATIONS

UK Patent Application; Tomio Sasaki et al.; "Image Area Discriminator"; published Jan. 2, 1992; GB 2 245 449.
UK Patent Application; Murry JamesJohn Holt; "Symbol Pattern Matching"; published Apr. 29, 1987; GB 2 181 875.
European Patent Application 0 356 038; Charles Cheng–Yuan Tung; "Piece–Wise Printed Image Enhancement for Dot Matrix Printers;" Published Feb. 28, 1990.
Robert P. Loce et al., *Facilitation of Optimal Binary Morphological Filter Design Via Structuring Element Libraries and Design Constraints*, Optical Engineering, vol. 31, No. 5, May 1992, pp. 1008–1025.
Edward R. Dougherty ed., *Mathematical Morphology in Image Processing*, Marcel Dekker 1992, pp. 43–90.
Robert P. Loce et al., *Optimal Morphological Restoration: The Morphological Filter Mean–Absolute–Error Theorem*, Journal of Visual Communications and Image Representation, (Academic Press), vol. 3, No. 4, Dec. 1992, pp. 412–432.
Edward R. Dougherty et al., *Optimal mean–absolute–error hit–or–miss filters: morphological representation and estimation of the binary conditional expectation*, optical Engineering, vol. 32, No. 4, Apr. 1993, pp. 815–827.
Robert P. Loce, *Morphological Filter mean–Absolute–Error Representation Theorems and Their Application to Optimal Morphological Filter Design*, Center for Imaging Science, Rochester Institute of Technology, (Ph. D. Thesis), May 1993.

* cited by examiner

*Primary Examiner*—Bhavesh Mehta
(74) *Attorney, Agent, or Firm*—Duane C. Basch

(57) ABSTRACT

The present invention is a method and apparatus for automatic image segmentation using template matching filters. The invention generally segments differing binary textures or structures within an input image by passing one or more structures while removing other structures. More particularly, the method and apparatus segment a stored binary image using a template matching filter that is designed to pass therethrough, for example, text regions while removing halftone regions.

7 Claims, 7 Drawing Sheets

METHOD AND APPARATUS FOR AUTOMATIC IMAGE SEGMENTATION USING TEMPLATE MATCHING FILTERS

This invention relates generally to a method and apparatus for automatic image segmentation using template matching filters, and more particularly to a method and apparatus for segmenting regions of differing texture or structure within a stored binary image using a template matching filter that is designed to pass at least one texture while removing one or more other textures.

CROSS REFERENCE

The following related applications are hereby incorporated by reference for their teachings:

U.S. patent Ser. No. 08/004,479 by Shiau (published at EP-A2 0 521 662 on Jan. 7, 1993), now U.S. Pat. No. 5,293,430;

"Method for Design and Implementation of an Image Resolution Enhancement System That Employs Statistically Generated Look-Up Tables," Loce et al., Ser. No. 08/169,485, filed Dec. 17, 1993, now U.S. Pat. No. 5,696,845;

"Non-Integer Image Resolution Conversion Using Statistically Generated Look-Up Tables," Loce et al., Ser. No. 08/170,082, filed Dec. 17, 1993, now U.S. Pat. No. 5,387,985;

"Method for Statistical Generation of Density Preserving Templates for Print Enhancement," Loce et al., Ser. No. 08/169,565, filed Dec. 17, 1993, now U.S. Pat. No. 5,359,423;

"Automated Template Design for Print Enhancement," Eschbach, Ser. No. 08/169,483, filed Dec. 17, 1993, now U.S. Pat. No. 5,724,455; and "Image Resolution Conversion Method that Employs Statistically Generated Multiple Morphological Filters," Loce et al., Ser. No. 08/169,487, filed Dec. 17, 1993, now U.S. Pat. No. 5,579,445.

INCORPORATION BY REFERENCE

U.S. Pat. No. 4,194,221 to Stoffel, U.S. Pat. No. 4,811,115 to Lin et al., and U.S. Pat. No. 5,131,049 to Bloomberg et al. are hereby specifically incorporated by reference for their teachings regarding image segmentation.

BACKGROUND AND SUMMARY OF THE INVENTION

The present invention is a novel approach to separating text, halftones, or other image structures in composite images using template-based filtering methods. A key application of the present invention is the segmentation of text regions from halftone regions. In the reproduction of an original document from video image data created, for example, by electronic raster input scanning from an original document, one is faced with the limited resolution capabilities of the reproducing system and the fact that output devices remain predominantly binary. This is particularly evident when attempting to reproduce halftones, lines and continuous tone images. Of course, an image data processing system may be tailored so as to offset the limited resolution capabilities of the reproducing apparatus used, but this is difficult due to the divergent processing needs required by the different image types that may be encountered. In this respect, it should be understood that the image content of the original document may consist entirely of high frequency halftones, low frequency halftones, continuous tones, text or line copy, or a combination, in some unknown degree, of some or all of the above. Optimizing the image processing system for one image type in an effort to offset the limitations in the resolution capability of the reproducing apparatus used, may not be possible, requiring a compromise choice that may not produce acceptable results. Thus, for example, where one optimizes the system for low frequency halftones, it is often at the expense of degraded reproduction of high frequency halftones, or of text or line copy, and vice versa. Beyond the issue of accurate reproduction, segmentation of different image types is key to the successful application of recognition algorithms (e.g., character recognition and glyph recognition) and efficient application of image compression techniques.

As one example of the problems encountered, reproduction of halftoned images with screening tends to introduce moire, caused by the interaction of the original screen frequency and applied screen frequency. Although the use of high frequency line screens can reduce the problem, the artifact can still occur in some images. In a networked environment particularly, it is desirable that the image processing device (e.g., raster input scanner) detect the halftone, and low-pass filter the document image into a continuous tone for subsequent halftone reproduction by printers in the network in accordance with their particular capabilities.

Heretofore, a number of applications, patents and publications have disclosed techniques for segmentation of digital image data, the relevant portions of which may be briefly summarized as follows:

U.S. patent application Ser. No. 08/044,479 to Shiau, teaches a particular problem noted in the use of an auto correlation function of the false characterization of a portion of the image as a halftone, when in fact it would be preferable for the image to be processed as a line image. Examples of this defect are noted particularly in the processing of Japanese Kanji characters and small Roman letters. In these examples, the auto correlation function may detect the image as halftones and process accordingly, instead of applying a common threshold through the character image. The described computations of auto correlation are one dimensional in nature, and this problem of false detection will occur whenever a fine pattern that is periodic in the scan line or fast scan direction is detected. In the same vein, shadow areas and highlight areas are often not detected as halftones, and are then processed with the application of a uniform threshold.

U.S. Pat. No. 4,194,221 to Stoffel, issued Mar. 18, 1980, discloses the problem of image segmentation. The problem was addressed by applying a discrimination function instructing the image processing system as to the type of image data present and particularly, an auto correlation function to the stream of pixel data, to determine the existence of halftone image data. Stoffel describes a method of processing automatically a stream of image pixels representing unknown combinations of high and low frequency halftones, continuous tones, and/or lines to provide binary level output pixels representative of the image. The described function is applied to the stream of image pixels and, for the portions of the stream that contained high frequency halftone image data, notes a large number of closely spaced peaks in the resultant signal. The correlator circuits described in Stoffel's embodiment, however, are very expensive, as they must provide a digital multiplication function. Accordingly, as a practical matter, Stoffel requires as a first step, reduction of the amount of data handled, by initially thresholding image data against a single threshold value, to reduce the image to a high contrast black or white image. However, depending on the selection of the threshold as compared to the intensity of the image, significant amounts of information may be lost in the thresholding process. For example, if the threshold level is set to distinguish in the middle of the intensity range, but the image has significant variations through the darker gray levels, the thresholded result does not indicate the variations. This results in an undesirable loss of image information. While it may be possible to vary the threshold value adaptively from original to original and from image area to image area, such algorithms tend to be complicated and work well only for a restricted class of images such as line images.

U.S. Pat. No. 4,811,115 to Lin et al., issued Mar. 7, 1989, teaches an auto correlation function that is calculated for the stream of halftone image data at selected time delays that are predicted to be indicative of the image frequency characteristics, without prior thresholding. The arithmetic function used in that auto correlation system is an approximation of the auto correlation function that employs logical functions and addition, rather than the multiplication function used in U.S. Pat. No. 4,194,221 to Stoffel. Valleys in the resulting auto correlated function are detected to determine whether high frequency halftone image data is present.

U.S. Pat. No. 5,065,437 to Bloomberg, issued Nov. 12, 1991, discloses a method for separating finely textured and solid regions in a binary image. Initially an operation is carried out on the image to thicken text and lines and to solidify textured regions. The image is then subjected to a second set of operations that eliminates ON pixels that are near OFF pixels, thereby thinning out and eliminating the previously thickened text and lines, but leaving the previously solidified textured regions.

U.S. Pat. No. 5,131,049 to Bloomberg, issued Jul. 14, 1992, discloses a method for creating a mask for separating halftone regions in a binary image from other regions. The method includes constructing a seed image, constructing a clipping mask, and filling the seed while clipping to the mask.

U.S. Pat. No. 5,341,226 to Shiau, issued Aug. 23, 1994, discloses a method and apparatus for processing color document images to determine the presence of particular image types in order to designate areas for optimal image processing thereof. A multi-separation image defined in terms of color density for each separation is converted to a luminance-chrominance definition, where one component of the image represents image intensity. An image segmentation process operates on the image intensity signal, the results of which are used to determine processing of the multi-separation image.

UK-A-2,153,619, published August 1985, teaches a similar determination of the type of image data. However in that case, a threshold is applied to the image data at a certain level, and subsequent to thresholding the number of transitions from light to dark within a small area is counted. The system operates on the presumption that data with a low number of transitions after thresholding is probably a high frequency halftone or continuous tone image. The thresholding step in this method has the same undesirable effect as described for Stoffel.

Robert P. Loce et al. in *Facilitation of Optimal Binary Morphological Filter Design via Structuring Element Libraries and Design Constraints*, Optical Engineering, Vol. 31, No. 5, May 1992, pp. 1008–1025, incorporated herein by reference, describes three approaches to reducing the computational burden associated with digital morphological filter design. Although the resulting filter is suboptimal, imposition of the constraints in a suitable manner results in little loss of performance in return for design tractability.

*Mathematical Morphology in Image Processing*, pp. 43–90 (Edward R. Dougherty ed., Marcel Dekker 1992), hereby incorporated by reference, describes efficient design strategies for the optimal binary digital morphological filter. A suboptimal design methodology is investigated for binary filters in order to facilitate a computationally manageable design process.

Robert P. Loce et al., in *Optimal Morphological Restoration: The Morphological Filter Mean-Absolute-Error Theorem*, Journal of Visual Communications and Image Representation, (Academic Press), Vol. 3, No. 4, December 1992, pp. 412–432, hereby incorporated by reference, teach expressions for the mean-absolute restoration error of general morphological filters formed from erosion bases in terms of mean-absolute errors of single-erosion filters. In the binary setting, the expansion is a union of erosions, while in the gray-scale setting the expansion is a maxima of erosions. Expressing the mean-absolute-error theorem in a recursive form leads to a unified methodology for the design of optimal (suboptimal) morphological restoration filters. Applications to binary-image, gray-scale signal, and order-statistic restoration on images are included.

Edward R. Dougherty et al., in *Optimal mean-absolute-error hit-or-miss filters: morphological representation and estimation of the binary conditional expectation*, Optical Engineering, Vol. 32, No. 4, April 1993, pp. 815–827, incorporated herein by reference, disclose the use of a hit-or-miss operator as a building block for optimal binary restoration filters. Filter design methodologies are given for general-, maximum-, and minimum-noise environments and for iterative filters.

Robert P. Loce, in *Morphological Filter Mean-Absolute-Error Representation Theorems and Their Application to Optimal Morphological Filter Design*, Center for Imaging Science, Rochester Institute of Technology, (Ph.D. Thesis), May 1993, incorporated herein by reference, discloses design methodologies for optimal mean-absolute-error (MAE) morphological based filters.

In accordance with the present invention, there is provided a method performed in an digital processor for processing a document image to determine image types present therein, the steps comprising:

receiving, from an image source, a document image having a plurality of pixels therein, each pixel represented by a density signal, and storing at least a portion thereof representing a region of the document image in a data buffer;

retrieving, from the data buffer, the density signals for the document image;

determining, using template matching filters, image types present in the region of the document image.

In accordance with another aspect of the present invention, there is provided an apparatus for processing binary image pixels in an image represented by a plurality of rasters of pixels, to preferentially pass regions having a first structure therethrough so as to produce an output image primarily comprised of regions exhibiting the first structure, including:

an image memory for storing the binary image signals;

a window buffer for storing a plurality of image signals from a plurality of rasters, said image signals representing pixels centered about a target pixel;

a template filter to generate an output image signal as a function of the image signals stored in the window buffer, wherein the output signal is equivalent to the image signal for regions of the binary image where the target pixel represents the first structure, and where the output signal is zero for regions of the binary image where the target pixel represents another structure; and an output memory for storing the output signal for each of a plurality of target pixels, wherein the signals stored in each location of said output memory are generated by said template filter as a function of the image signals within a window whose contents are determined as a function of the corresponding target pixel location.

In accordance with yet another aspect of the present invention, there is provided an apparatus for processing binary image pixels in an image represented by a plurality of rasters of pixels, to identify regions exhibiting a particular structure therein, comprising:

an image source for producing a document image having a plurality of pixels therein, each pixel represented by a density signal;

memory for storing at least a portion of the density signals representing a region of the document image in a data buffer; and a segmentation circuit employing template-matching filters to identify the presence of the particular structure in the region of the image stored in said memory.

One aspect of the invention is based on the discovery that templates may be employed to recognize one binary structure within one or more textures. More specifically, template-based filters may be used to recognize regions of an image that contain text and line art. This discovery further avoids problems that arise in techniques that attempt to cover a broad range of document types, as the present invention further enables the "customization" of the template-based filters used therein in response to training documents that are representative of documents commonly encountered by the image processing system. This aspect is further based on the discovery of techniques that generate statistical representations of the patterns found in text and halftone regions of documents as further described, for example, by Eschbach in U.S. application Ser. No. 08/169, 483 and Loce et al. in U.S. application Ser. No. 08/169,485.

The technique described herein is advantageous because it is inexpensive compared to other approaches and is flexible, in that it can be adapted to any of a number of input document types exhibiting a wide range of possible patterns. As a result of the invention, a low-cost image segmentation system may be accomplished.

Figure 1:
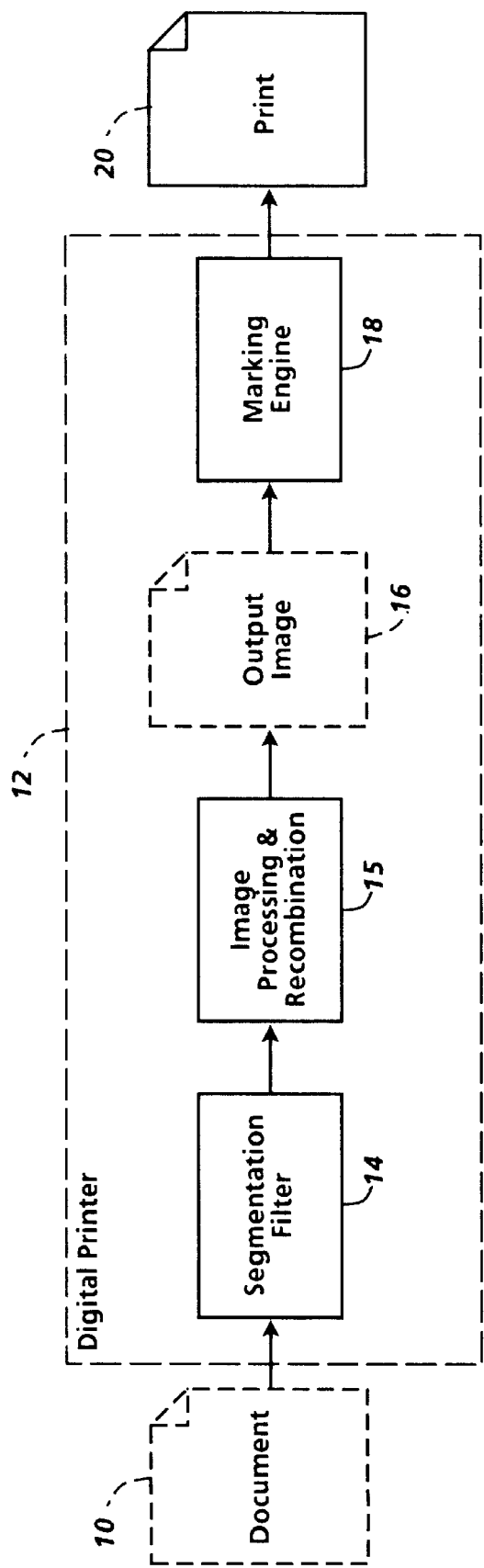
FIG. 1 is a general block diagram showing an embodiment of the automatic image segmentation apparatus in accordance with the present invention, where the invention is employed in a document reproduction system.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." A bit is an "inverse" of another bit if the two bits have different values. An N-bit item of data has one of a possible $2^N$ values. The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium. "Memory circuitry", "memory", or "register" is any circuitry that can store data, and may include local and remote memory and input/output devices.

A "data processing system" is a physical system that processes data. A "data processor" or "processor" is any component or system that can process data, and may include one or more central processing units or other processing components.

A processor or other component of circuitry "uses" an item of data in performing an operation when the result of the operation depends on the value of the item. For example, the operation could perform a logic or arithmetic operation on the item or could use the item to access another item of data.

An "image" is generally a pattern of physical light. An image may include characters, words, and text as well as other features such as graphics. Text may be included in a set of one or more images. An image may be divided or segmented into "segments" or "regions," each of which is itself an image. The "structure" of an image segment or region is generally determined by the primary content of the region including, for example, text, halftone or graphics structures. A segment of an image may be of any size up to and including the whole image. An image may also refer to a two-dimensional data array that represents a pattern of physical light. A "document," which may exist in either hardcopy (written or printed) or electrical (data array) form, is a representation of one or more images and/or text. A document may include multiple pages.

An item of data "defines" an image when the item of data includes sufficient information to produce the image. For example, a two-dimensional array can define all or any part of an image, with each item of data in the array providing a value indicating the color and/or intensity of a respective location of the image. If a two-dimensional array or other item of data defines an image that includes a character, the array or other data also defines the character.

Each location in an image may be called a "pixel." A "pixel" is the smallest segment into which an image is divided in a given system. In an array defining an image in which each item of data provides a value, each value indicating the color and/or intensity of a location may be called a "pixel value". Each pixel value in a binary image is an electrical signal in a "binary form", a gray-scale value in a "gray-scale form" of an image, or a set of color space coordinates in a "color coordinate form" of an image, the binary form, gray-scale form, and color coordinate form each being a two-dimensional array defining an image. Hence, the term pixel may also refer to the electrical (or optical) signal representing the measurable optical properties of a physically definable region on a display medium. A plurality of physically definable regions for either situation represents the measurable properties of the entire image to be rendered by either a material marking device, electrical or magnetic marking device, or optical display device. Lastly, the term pixel may refer to an electrical (or optical) signal representing physical optical property data generated from a photosensitive element when scanning a physical image, so as to convert the physical optical properties of the image to an electronic or electrical representation. In other words, in this situation, a pixel is an electrical (or optical) representation of the optical properties of an image measured at a definable area by an optical sensor.

An item of data "relates to" part of an image, such as a pixel or a larger segment of the image, when the item of data has a relationship of any kind to the part of the image. For example, the item of data could define the part of the image, as a pixel value defines a pixel; the item of data could be obtained from data defining the part of the image; the item of data could indicate a location of the part of the image; or the item of data could be part of a data array such that, when the data array is mapped onto the image, the item of data maps onto the part of the image. An operation performs "image processing" when it operates on an item of data that relates to part of an image.

Pixels are "neighbors" or "neighboring" within an image when there are no other pixels between them or when they meet an appropriate criterion for neighboring, such as falling within a positioned observation window. If the pixels are rectangular and appear in rows and columns, each pixel may have 4 or 8 connected neighboring pixels, depending on the criterion used.

An "image input device" is a device that can receive an image and provide an item of data defining a representation of the image. A "scanner" is an image input device that receives an image by a scanning operation, such as by scanning a hardcopy document for example, the Xerox 7650 Pro Imager scanner and Xerox 7009 Facsimile Terminal are devices which receive hardcopy documents to produce data defining an image. Other image input devices include data processing systems suitable for generating digital documents in response to instructions from a user.

An "image output device" (IOT) is a device that can receive an item of data defining an image and provide the image as output. A "display" is an image output device that provides the output image in human viewable form. The visible pattern presented by a display is a "displayed image" or simply "image." A "printer" or "marking engine" is an image output device capable of rendering the output image in human readable form on a removable medium.

Turning now to FIG. 1, which shows an embodiment of the automatic image segmentation apparatus, employed in an image reprographic setting in accordance with the present invention, the general components of digital printer 12 are depicted. More specifically, an input image 10 would be presented to digital printer 12 to produce a printed output 20. Within digital printer 12 a segmentation filter 14 transforms the input image in accordance with the present invention into at least two segmented images, in a simplified case, to segment text and halftone regions thereof. The segmented image bitmaps are, in turn, passed to an image processing/recombination circuit 15. As will be further described, image processing circuit processes the segmented images to produce an output image 16, that is optimized for the given marking process. Alternately, while in segmented form, the specific image segments may be isolated and grouped into regions using techniques, such as morphological opening or closing. Once a segment or region is isolated, each pixel may be tagged by setting the state of an associated tag bit in accordance with the image type (e.g., text, halftone, other). The tagged sections may then be recombined into a single bit-map with tags. When passed on to subsequent operations, the individual pixels within a region are treated in a manner that is optimized for the particular region. Subsequently, output image 16 may be passed to marking engine 18 for exposure and development, as is well-known, to produce output print 20.

Figure 2:
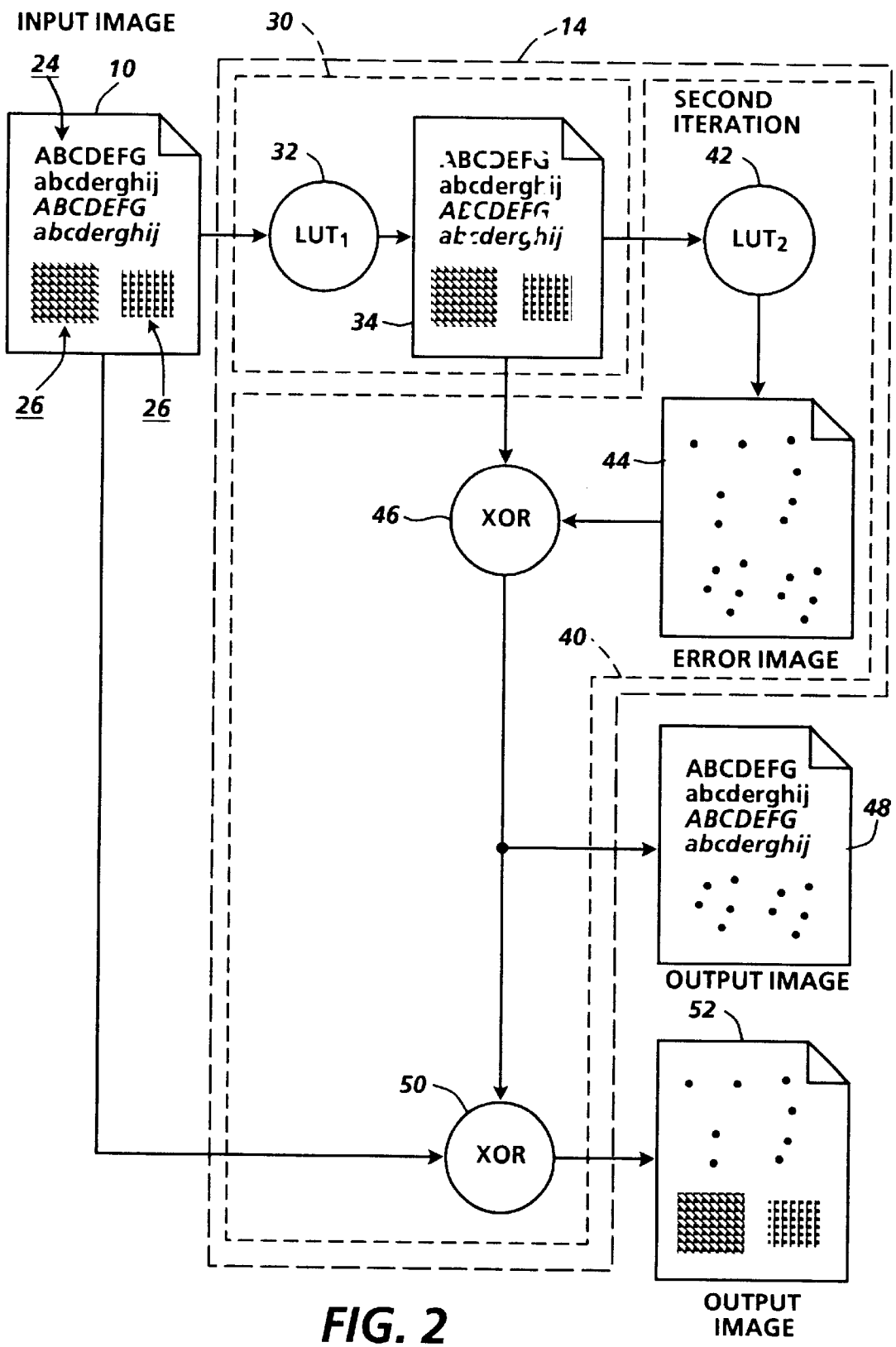
FIG. 2 is a data flow diagram illustrating a two-stage image segmentation process in accordance with the present invention.

Referring now to FIG. 2, the data flow diagram illustrates a two-stage image segmentation process that is carried out within segmentation filter 14 of FIG. 1. Although depicted as a preferable two-stage filter, it is understood that a single-stage iteration could have been employed or that additional stages or iterations could be used to further reduce the error in classification of text and halftone regions of the image. In the figure, input document 10, including regions of both text 24 and halftone 26, is passed to a first iteration filter circuit 30. Input document 10 is preferably a plurality of binary data signals representing, for example, the text, halftone and graphic image regions that make up the document. The input document image may be produced as a digitized representation of a hardcopy document scanned on a scanner. In the first filter circuit, the document image is filtered by comparing segments thereof with predefined patterns, referred to herein as templates, stored as $LUT_1$. As is further illustrated in the flowchart of FIG. 3, and associated examples of FIGS. 4A and 4B, once the input document is obtained, step 100, a target pixel "X" is identified, and a set of surrounding pixels are treated as a window, step 102. FIG. 4A illustrates a portion of a digitized image 130 having an upper portion 130a containing text, and a lower portion 130b containing a halftone region. Magnified portions 132 and 134, of image 130, are shown in FIG. 4B, where the individual pixels comprising the image are discernible.

The values of the pixel signals within the window are then compared to the templates stored in memory, for instance, the templates 136a–136f and 138 illustrated in FIG. 4. Preferably, the template filter is implemented as a look-up table (LUT). When a matching template is found, step 106, the target pixel is identified as a text pixel, step 120, and allowed to pass unchanged through the filter, step 122. Otherwise, the process continues at step 108 where the presence of further templates is tested. If further templates are available for comparison with the window, the process continues at step 110. Otherwise, when no further templates are available, the pixel is identified as being representative of a halftone segment or background region of the input image, step 112, and an output of "0" or an "OFF" pixel signal is produced, step 114.

In a preferred multiple iteration embodiment, following the first iteration as described above, the filter attempts to identify error pixels and further remove them from, say, the text image. Because errors pixels tend to be much sparser than the identified text pixels, a different class of filters could be used for successive iterations. For example an order-statistic filter could be used, where if less than a predetermined number of pixels are active within a neighborhood window, the target pixel will be considered an error pixel. Alternatively, a similar neighborhood checking could be performed with morphological filters.

Note that the serial method described above with respect to the flowchart of FIG. 3, which is appropriate for software implementations of the LUT, may also be accomplished using electrical circuitry. Higher speed performance many be obtained using a hardware implementation where the LUT's would be implemented using an Application Specific Integrated Circuit (ASIC) or Programmable Logic Array (PLA).

Figure 5:
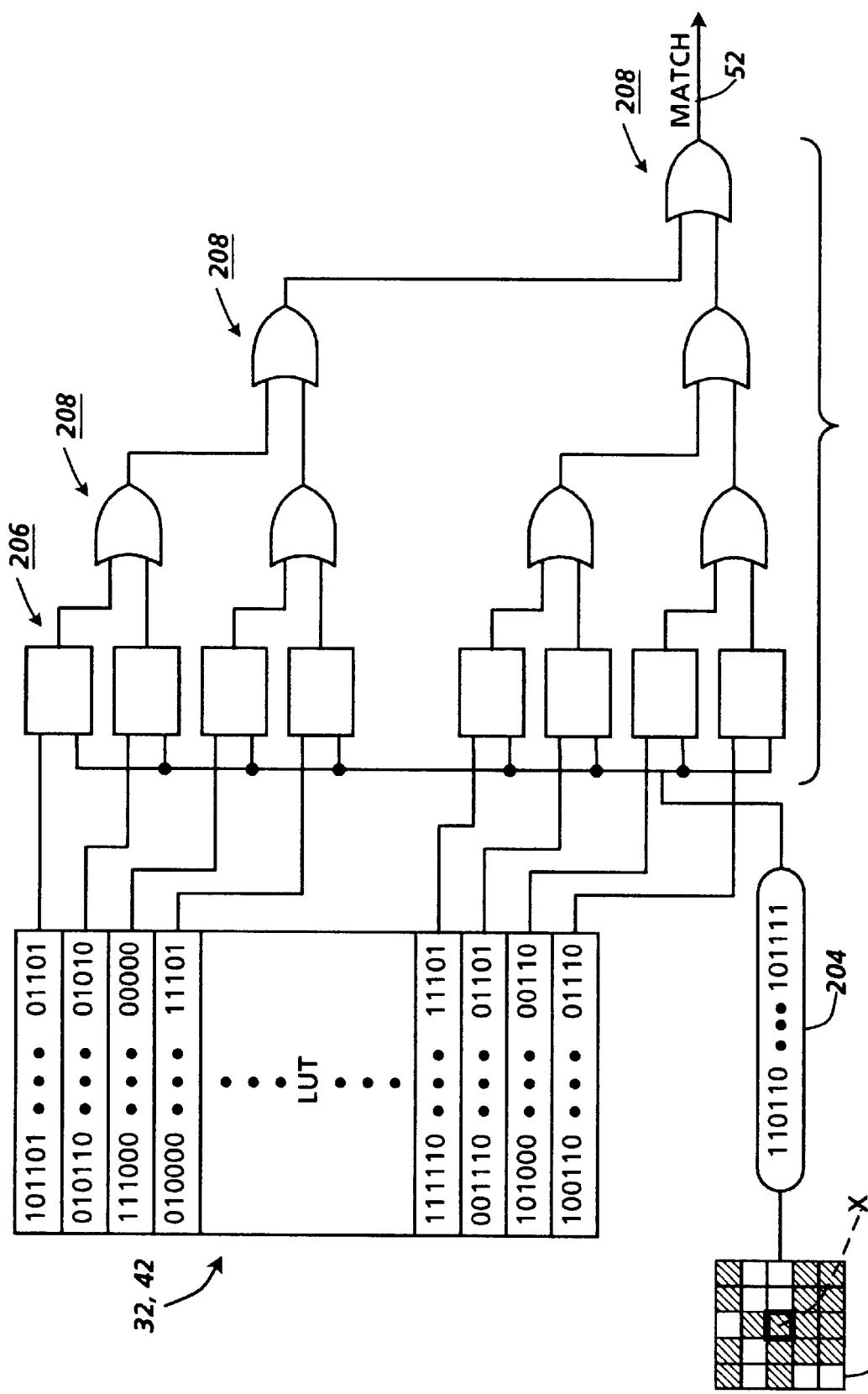
FIG. 5 is a simplified electrical schematic illustrating the implementation of a parallel processing scheme for a template-based segmentation circuit in accordance with one aspect of the present invention.

As a simplified example of such an embodiment, the electrical circuit schematic of FIG. 5 is provided. In filter circuit 200, the document image is filtered by comparing segments thereof with predefined patterns, referred to herein as templates, stored as look-up tables (32 or 42). As is illustrated in FIG. 5, once the input document is obtained a target pixel X is identified, and a set of surrounding pixels are treated as a window, 202. The values of the pixel signals within the window are then transferred to a register 204, or similar memory location suitable for holding data signals representative of the pixels within window 202.

Using a plurality of logic gates 206 (which may be a combination of AND or NOR gates depending upon binary value in any particular template position), or similar logic operations, the signals stored in register 204 are compared to the templates stored as a series of signals in LUT memory; where the set of stored signals for each template represents a unique pixel pattern to be detected within the window. For example, LUTs 32 or 42 would be populated with templates similar to those of 136a–136f and 138 as illustrated in FIG. 4. It is further noted that, while illustrated for simplicity as single elements 206, implementation of the parallel comparison operation described would require a plurality of logic gates for each template or look-up table entry, as would be apparent to one skilled in the art. As is further apparent to one skilled in the art, logic minimization techniques may be employed to enable the rapid, parallel comparison of the LUT templates with the values stored in register 204.

After the parallel comparison step, accomplished by comparing the signals in register 204 with the associated signals in each entry of LUT 32, 42, any match between the signal sets would result in a positive logic signal being passed into the logical OR array, represented by reference numeral 208. As previously described with respect to the text structure template-based filter, the output of the OR gate array would identify target pixel X as a text pixel, where it may be allowed to pass unchanged. Otherwise, the target pixel could be identified as a non-text region and flagged to produce an output of "0" or an "OFF" pixel signal.

Figure 3:
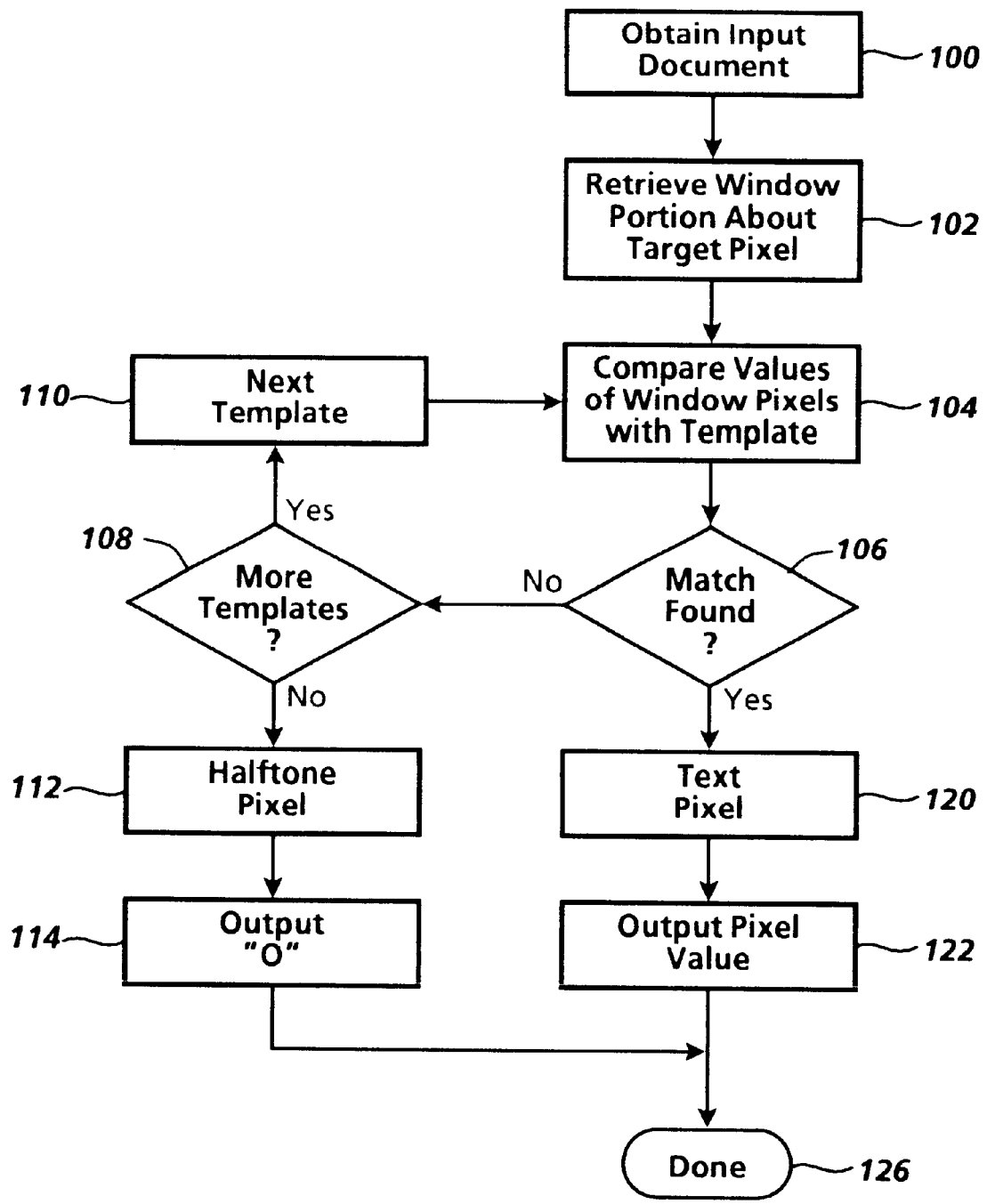
FIG. 3 is a flowchart illustrating the various steps in a serial process used to apply a template-based segmentation filter to the input image of FIG. 1.
Figure 4A:
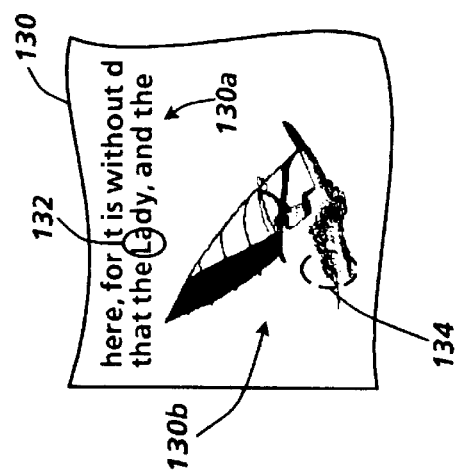
FIGS. 4A and 4B are pictorial representations of the operation of the template-based segmentation filter on a region of an image in accordance with the present invention.
Figure 4B:
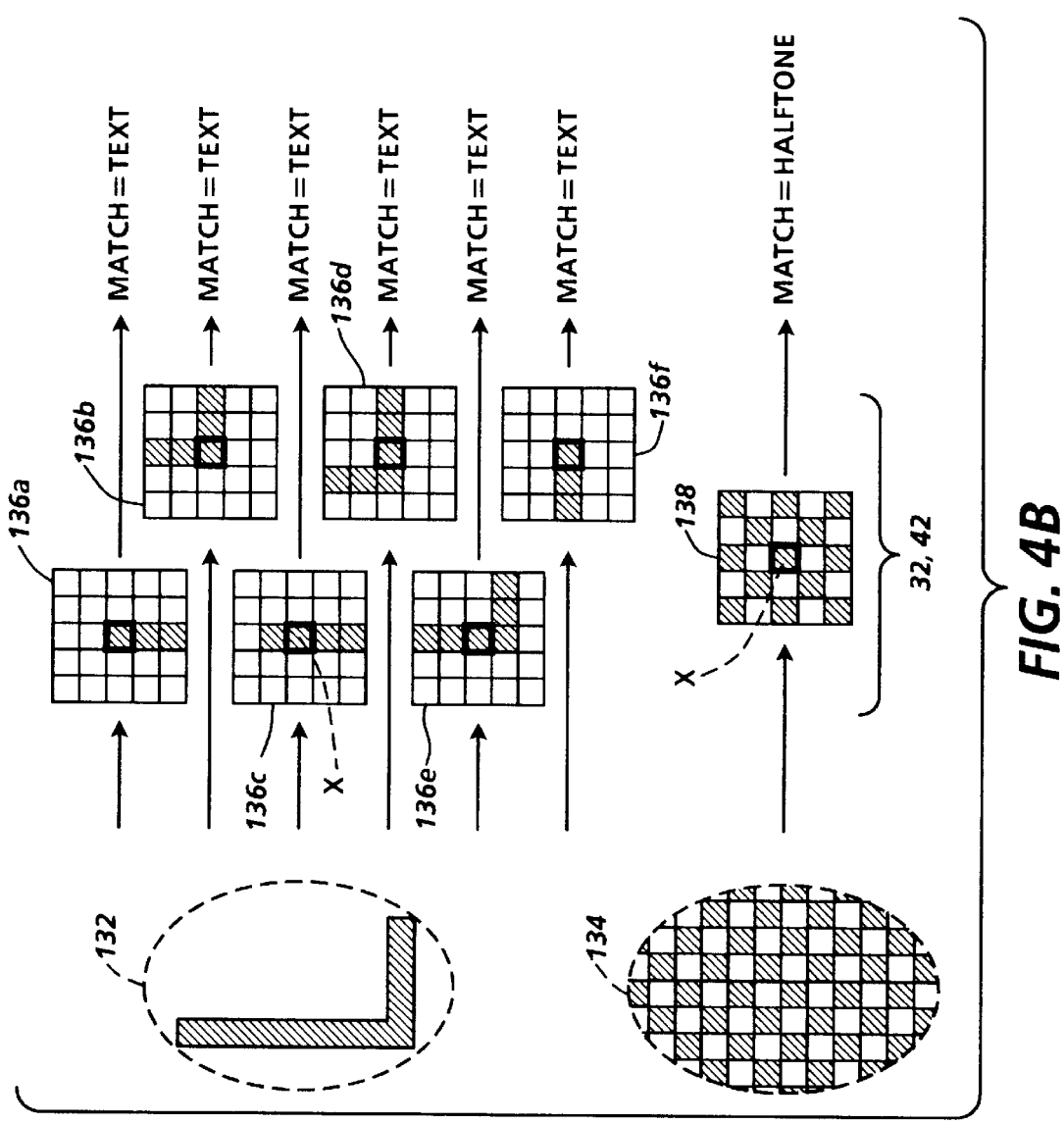

Once processed in accordance with the steps of FIG. 3 or by the circuitry of FIG. 5, both being preferably implemented with a look-up table 32, the first filter output image 34 results. Subsequently, a second iteration of a template-based filter 40 is accomplished in a manner similar to that previously described with respect to FIGS. 3, 4A–B and 5. More specifically, referring again to FIG. 2, the first filter output is then used as the input and compared against the templates stored in $LUT_2$ (42), to generate the error image 44. Subsequently, error image 44 is XORed (46) with the first output image to produce the text-only output image 48. Alternatively, the text-only output image 48 may be further XORed (50) with the input document to produce halftone-only output image 52. Thus, segmented binary images 48 and 52 may be output, said segmented images primarily comprising marks representing one of the structures passed by the filters. For example, segmented images 48 and 52 are, respectively, images having only text or halftone image segments therein.

It is further understood that the output of the filtering process, as depicted in FIGS. 3, 4A–B and 5, may also be a purely binary signal indicating whether a match was located for each particular target pixel considered. In this manner, the output of the template-based filters would be binary in nature, and would not necessarily allow the passage or masking of the image segments without performing further logic operations on the input image.

Referring again to FIG. 1, once the segmented images are produced by segmentation filter 14, they may be subsequently operated on by a image processing and/or recombination operation, represented as block 15. In particular, the image processing operations may employ filters and other well-known techniques specifically designed to process the segmented image structures isolated by segmentation filter 14. Furthermore, once processed, the segmented images may be recombined to form output image 16 in a form suitable for improved rendition by marking engine 18.

Figure 6:
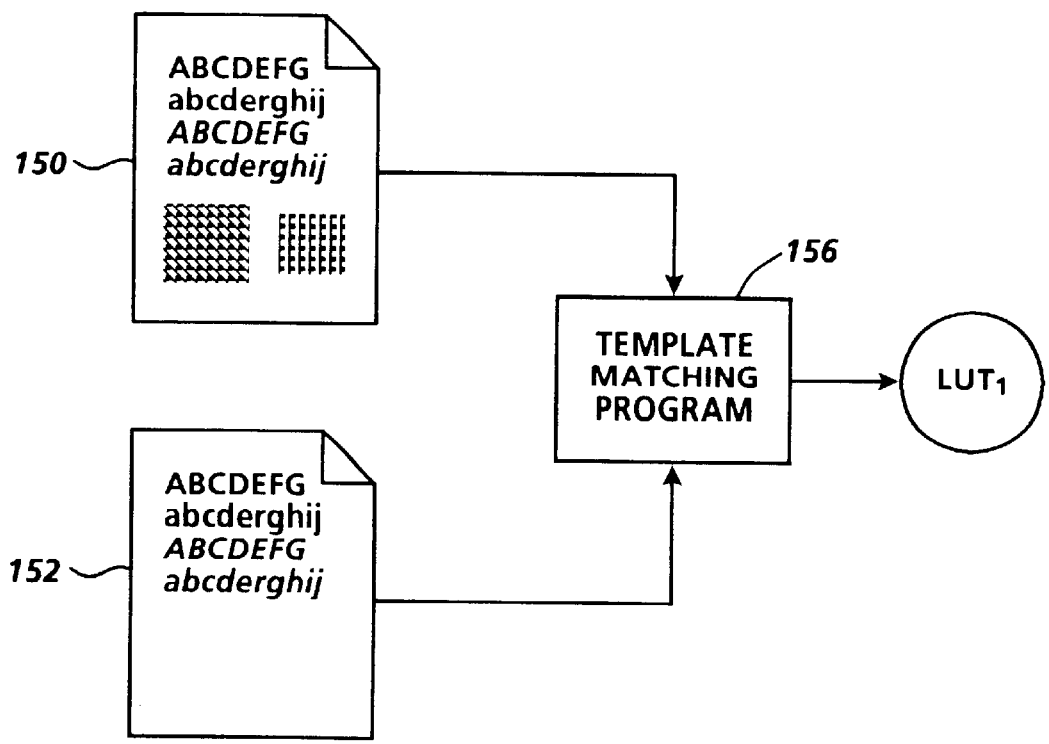
FIGS. 6 and 7 are data flow diagrams illustrating the various stages in the process used to design the template-based segmentation filters of the present invention.
Figure 7:
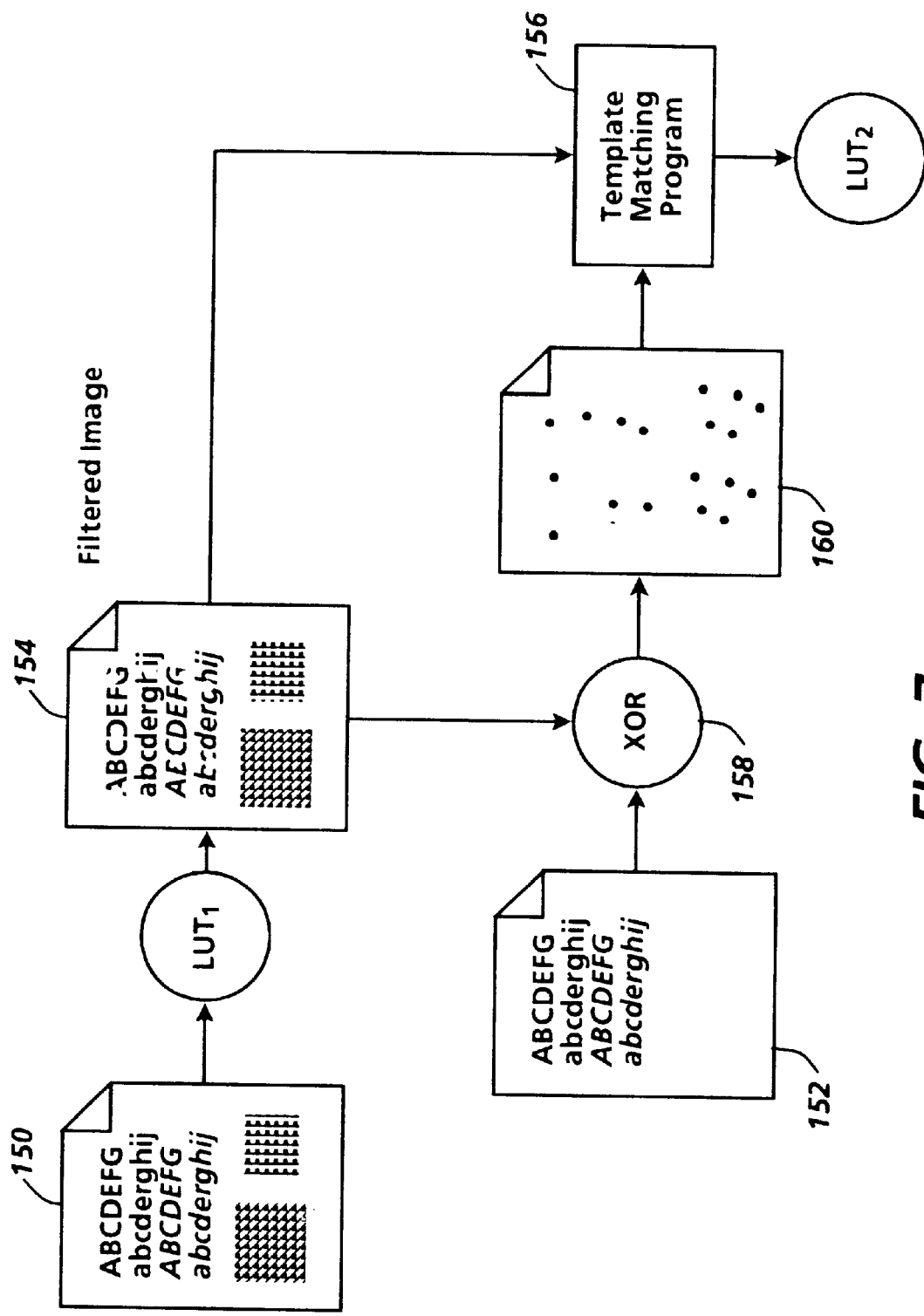

Turning now to FIGS. 6 and 7, data flow diagrams illustrating the various stages in the process used to design the template-based segmentation filters of the present invention will now be described. As illustrated in FIG. 6, $LUT_1$ is produced by using a pair of training documents wherein the first training document 150 is a digital representation of an electronic document containing both text and halftone regions. The second training document, document 152, is identical to the first training document, except that it has been edited to remove the halftone regions therein. To produce the templates to be stored in $LUT_1$, the first and second training documents are passed to template matching program 156. Program 156 works in accordance with the methods described by Loce et al. in "Non-Integer Image Resolution Conversion Using Statistically Generated Look-Up Tables," Ser. No. 08/170,082, filed Dec. 17, 1993, by Loce et al. in "Method for Design and Implementation of an Image Resolution Enhancement System That Employs Statistically Generated Look-Up Tables," Ser. No. 08/169,485, filed Dec. 17, 1993, which is hereby incorporated by reference for its teachings. Generally, the filter design process accomplished by the template matching program will allow for design of optimized template-matching filters that are then stored in a programmable memory as $LUT_1$. As is apparent, many aspects of the present invention or the associated template design process may be accomplished or simulated using a programmable data processing system.

In the application cited above, the LUT design process produces a filter that results in a minimum number of pixels in error when applied to an input image. In the present case, it may be more important to not make errors in the halftone portion of the image, as opposed to the text portion of the image. Therefore in an alternative embodiment it may be preferable to apply a weighting factor, greater than 1, to halftone pixels in the training document, so the statistical design procedure attempts to minimize halftone pixel classification error more than text pixel classification error. In general, it may be preferable to weight pixels of one structure in the training documents. The weighting could be straightforward such as each halftone pixel is figured into the statistics as N pixels would normally be treated.

Once the first stage or iteration of the segmentation filter is generated and stored as $LUT_1$, the second stage may be produced. As illustrated by the data flow diagram of FIG. 6, the original image 150 is passed to the first-stage segmentation filter represented as $LUT_1$. The output, filtered image 154 is then stored so that it can be passed to XOR logic circuit 158, where it is XORed with the text-only training document 152. The output of the XOR operation 158, error image 160, is then passed to template matching program 156 along with the filtered image 154. In this second occurrence of the template matching program, the output will be a series of templates depicted as $LUT_2$. It should be noted that additional iterations of the second segmentation filter design process, FIG. 6, would be necessary to generate additional templates ($LUT_n$) to accomplish further segmentation filtering.

In recapitulation, the present invention is a method and apparatus for automatic image segmentation using template matching filters. The invention generally segments differing binary textures or structures within an input image by passing one or more structures while removing other structures. More particularly, the method and apparatus segment a stored binary image using a template matching filter that is designed to pass therethrough, for example, text regions while removing halftone regions.

It is, therefore, apparent that there has been provided, in accordance with the present invention, a method and apparatus for efficiently employing template based filters to accomplish image segmentation. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method performed in an digital processor for processing a document image to determine image types present therein, the steps comprising:

receiving, from an image source, a document image having a plurality of pixels therein, each pixel represented by a density signal, and storing at least a portion thereof representing a region of the document image in a data buffer;

retrieving, from the data buffer, the density signals for the document image; and determining, using template matching filters, image types present in the region of the document image by applying a first stage template matching filter to the density signals for the document image to produce a first filtered output image, said step of applying a first stage template matching filter to the density signals for the document image comprising identifying a window within the document image so as to select a subset of the document image density signals and comparing the density signals in the window to a pattern within the template based filter, the pattern representing a pattern determined to occur in a textual segment of an image wherein a plurality of signals representing a pattern within the template-based filter are stored in each location of a look-up table memory and the step of comparing the density signals in the window to a pattern within the template-based filter comprises storing the subset of document image density signals in a register memory, logically comparing each density signal in the register memory with a uniquely associated signal of the template based filter stored in the look-up table memory location, and outputting a logic signal indicative of the result obtained in the logical comparing step applying a second stage template matching filter to the first filtered output image to produce an error image, and XORing the error image and the first filtered output image to mask from the first filtered output image any density signals from segments of the document image not comprised of text to produce a first output image, wherein the first output image contains only textual segments therein.

2. An apparatus for processing binary image pixels in an image represented by a plurality of rasters of binary image pixels, each representing the binary state of a single pixel within the image, to identify regions exhibiting a particular, unique binary pixel structure therein, comprising:

an image source for producing a document image having a plurality of binary image pixels therein, each pixel represented by a binary density signal;

memory for storing at least a portion of the binary density signals representing a region of the document image in a data buffer; and a segmentation circuit employing template-matching filters to identify the presence of the particular, unique binary pixel structure in the region of the image stored in said memory, the segmentation circuit further comprising a logic filter for removing the particular, unique binary pixel structure from the region of the image stored in said memory to produce an output image substantially void of the particular, unique binary pixel structure.

3. The apparatus of claim 2, wherein said segmentation circuit includes a multiple-stage template-based filter.

4. The apparatus of claim 3, wherein a first stage of said multiple-stage filter includes a look-up table preprogrammed with a plurality of entries, each of said entries corresponding to a pixel pattern determined to represent a segment of a training image having only textual content.

5. The apparatus of claim 4, wherein a second stage of said multiple-stage filter includes a look-up table preprogrammed with a plurality of entries, each of said entries corresponding to a pixel pattern determined to represent a segment of a training image having only textual content.

6. The apparatus of claim 2, wherein the particular, unique binary pixel structure is a halftone.

7. The apparatus of claim 2, wherein the particular, unique binary pixel structure is text.

* * * * *